United States Patent [19]

Ochylski

[11] 4,011,630
[45] Mar. 15, 1977

[54] HOG SKINNING METHOD AND APPARATUS

[76] Inventor: Edward Ochylski, 9155 S. Pleasant, Chicago, Ill. 60620

[22] Filed: Jan. 7, 1974

[21] Appl. No.: 431,033

[52] U.S. Cl. .......................................... 17/21; 17/50
[51] Int. Cl.² .......................................... A22B 5/16
[58] Field of Search ..................... 17/21, 50, 45, 46

[56] References Cited

UNITED STATES PATENTS

| 2,994,908 | 8/1961 | Fill | 17/1 R |
|---|---|---|---|
| 3,159,869 | 12/1964 | Vogt et al. | 17/23 |
| 3,423,789 | 1/1969 | Ochylski | 17/21 |
| 3,621,514 | 11/1971 | Brown | 17/40 |
| 3,657,770 | 4/1972 | Wallace | 17/45 |
| 3,774,265 | 11/1973 | Anderson et al. | 17/45 |
| 3,871,084 | 3/1975 | Carrington et al. | 17/21 |

FOREIGN PATENTS OR APPLICATIONS 142,904  5/1961  U.S.S.R. ................................ 17/21

OTHER PUBLICATIONS

*Farmers' Bulletin No.* 2138, Slaughtering, Cutting and Processing Pork on the Farm, U.S. Department of Agriculture, Pub. 1967, p. 18.

Primary Examiner—Louis G. Mancene
Assistant Examiner—James D. Hamilton
Attorney, Agent, or Firm—Merriam, Marshall, Shapiro & Klose

[57] ABSTRACT

Hogs are skinned by suspending the carcass in the head-up position, freeing the hide from around the neck and head of the carcass, and pulling downwardly on the upper end of the hide whereby the hide is removed from the carcass.

27 Claims, 4 Drawing Figures

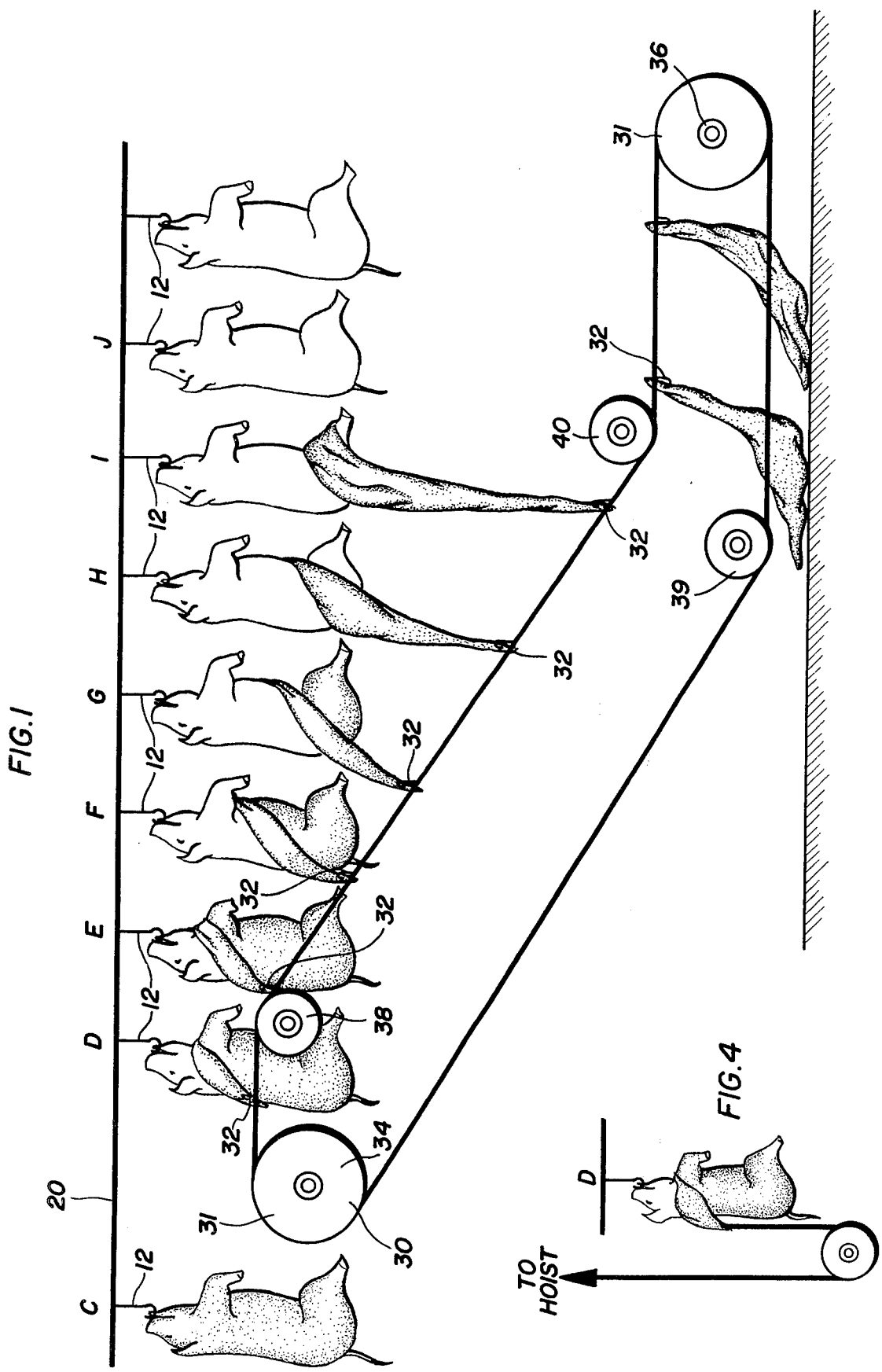

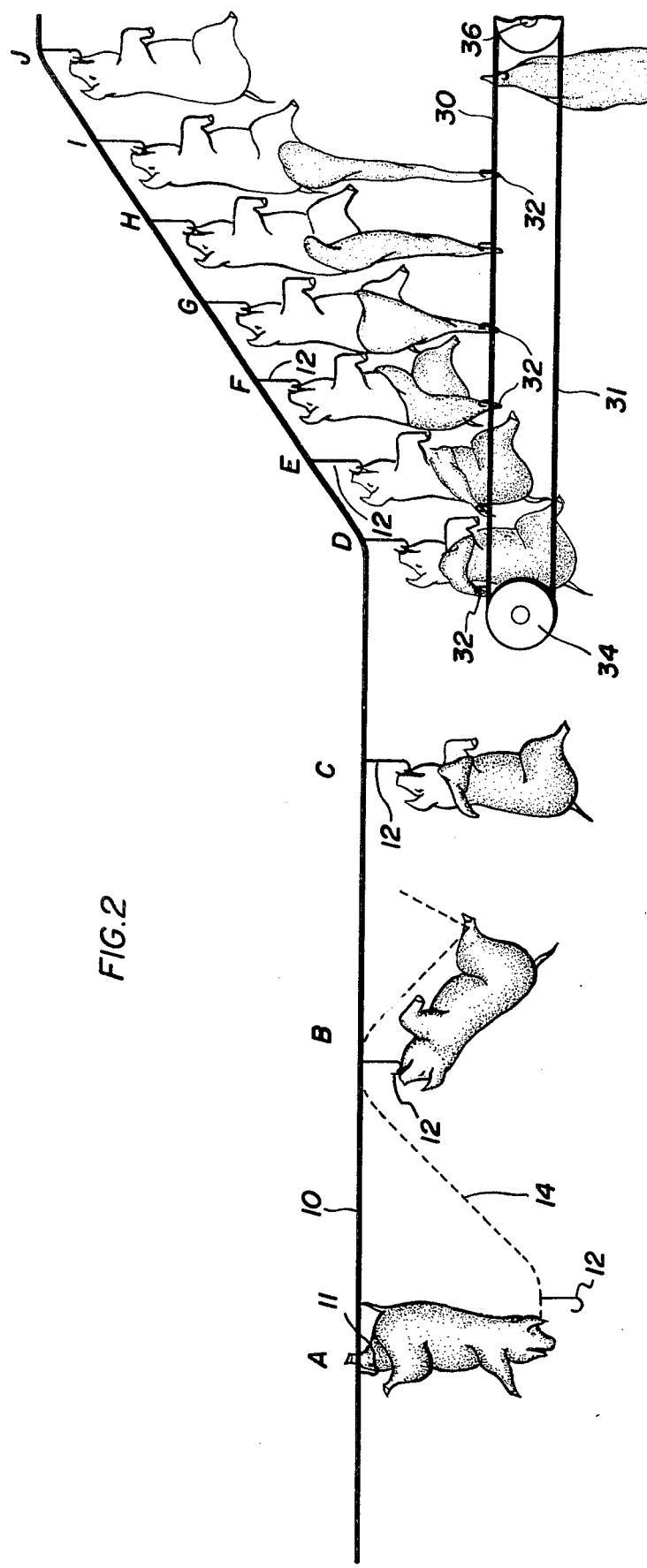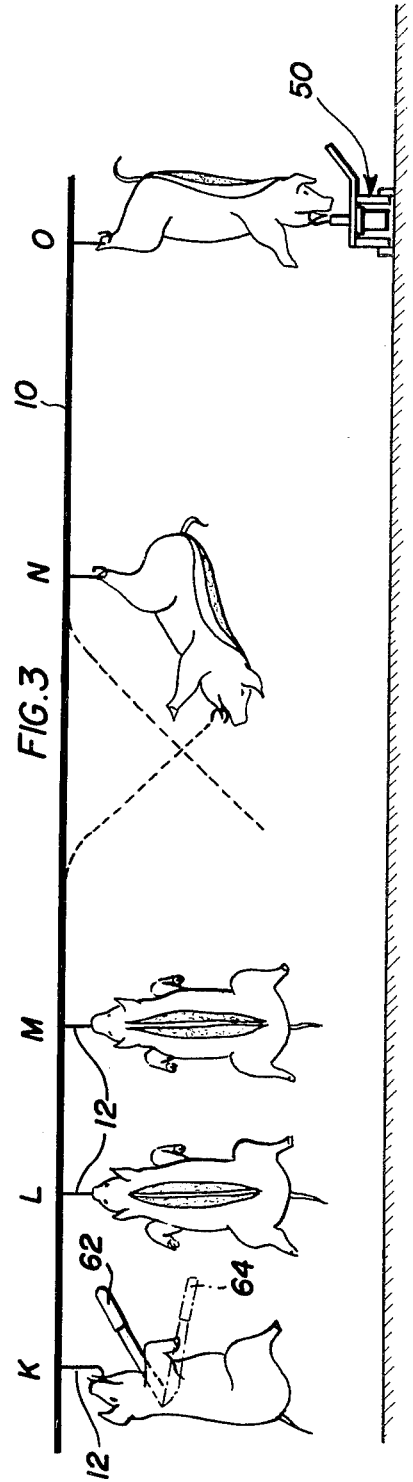

HOG SKINNING METHOD AND APPARATUS

The present invention relates to a method for removing the hide from hog and other animal carcasses, wherein the carcass is suspended in the head-up position and the hide is pulled downwardly toward the butt end of the carcass. The invention also relates to an apparatus suitable for continuously carrying out the method and pulling the hide from a suspended hog carcass while the carcass is horizontally moving through a slaughter house.

BACKGROUND

The conventional method of butchering hogs does not contemplate the removal of the hide or skin prior to the butchering operations, but the hog, after killing, is carried through a series of operations designed to remove the hair and bristles and to thoroughly clean the outer skin surface of the hog carcass. In the conventional procedures, substantially all of the skin or hide remains on the hog during the killing operation and throughout most of the butchering operation.

In order to prepare the carcass for the conventional dehairing operation, the carcass is first scalded by placing it in a tank of hot water (at temperatures of from 135° to 145° F.) for about 5 minutes. The purpose of the scalding tank is simply to loosen up the hair of the hog to prepare the carcass for the dehairer. As is explained below, the hogs move through the slaughtering operation at speeds up to 1440 feet per hour, which requires the scalding tank to be at least 120 feet long. The installation of such a tank represents a substantial investment and the operation is costly in terms of the overall maintenance and the heat requirement necessary to keep the water at the requisite temperatures. Further, disposal of the water from the tank represents a serious pollution problem.

After the carcasses have been scalded in the tank, they are conveyed to a dehairing machine which comprises a series of rubber paddles which beat most of the loosened hair from the carcass. The next step in the conventional dressing method is to singe the carcass in a gas flame. The purpose of the gas flame is to burn off the remaining hair. The operation of the dehairing and singeing equipment is extremely costly since the equipment required is expensive and it requires substantial floor space as well as requiring continuing maintenance. Further, since Federal regulations require that all equipment in packing houses be cleaned and sterilized on a daily basis, the maintenance of these machines requires a great deal of labor and consequently is very expensive. In addition to requiring a substantial quantity of fuel, the fumes from the singeing apparatus are pungent and offensive, and represent another pollution problem.

Following the singeing operation, the carcasses are shaved to remove the last traces of hair and bristles. Since the carcasses vary in size substantially from one to another, it is necessary that the shaving operation be done by hand. In a typical operation, as many as eight men are required to accomplish the shaving operation. In some cases the bristles are sufficiently tough that portions of the skin or hide must be actually cut away.

Following the shaving operation, the carcass is washed and is then ready for the butchering operation whereby the carcass is opened up. The conventional butchering operations which follow the cleaning of the hide include removal of the head, evisceration, splitting the carcass, and inspection of the carcass, which may take place in several stages.

Following the evisceration and splitting operations, in the conventional process, the split carcasses are chilled for a period of 12 to 20 hours in order to lower the internal carcass temperature to approximately 36°–38° F., the temperature necessary to firm up the meat and permit the carcass to be cut into primal cuts, after which various portions are skinned according to the need.

In the butchering and dressing of hogs and other such animals, it is common to suspend the animals in the normal head-down position by their hind feed or legs by means of hooks called gambrels. The gambrels are swively mounted on trolleys located on overhead tracks which lead through the various butchering operations. The trolleys, and in turn the animals, are moved along the overhead track by a mechanism such as a chain conveyor having pusher plates depending therefrom, which plates push the trolleys about the killing and dressing rooms. In this manner, the animals are moved in a continuous stream to the stations in the plant where the various butchering operations are performed. In a hog butchering plant, the animals are typically hung on two foot centers, which leaves adequate space for the various butchering operations to be performed. To be commercially attractive, such plants must be capable of handling up to 770 hogs per hour, so that it is desirable that the conveyor move at a maximum speed of up to 1440 feet per hour.

It is obviously desirable to dress as many carcasses as possible within a given period of time, since the unit cost to dress a given carcass will decrease with any increase in the number of carcasses dressed in any given period of time. It therefore follows that if the conveyor is stopped or slowed during any station of the operation, the total number of carcasses dressed in a given period of time will be decreased.

One of the operations in a packing plant which typically causes bottlenecks is the cleaning and dehairing operation.

Recently, machinery has been devised to remove the skin from a hog carcass in substantially one piece while the hog carcass is suspended or moving along a conveyor (See U.S. Pat. Nos. 3,209,395; 3,621,514; and 3,423,789). In addition to eliminating the conventional scalding and dehairing operation, a skinning operation which does not scald produces a hide which is a good leather and is far more valuable than the hide from a scalded animal. Most of these prior art patents describe the skinning of hogs while the carcasses are suspended in the normal head-down position by the hind legs. Since the conventional head-down attitude is used in the sticking or bleeding operation, the prior art apparatus has simply left the carcass in the head-down attitude and devised various types of apparatus designed to skin the carcass while it was in this attitude.

Since it is difficult and impractical to skin a hog by drawing the skin from the butt end toward the head, most of the prior art devices which have significant commercial promise accomplish the skinning by pulling the hide from the head end of the carcass toward the butt end of the carcass. In order to remove the hide from the carcass while the carcass is in the head-down position, it is necessary to secure the carcass, both by head and foot (butt-end or hind feet suspension), followed by drawing the hide from the head toward the butt in a substantially upward, vertical, direction. However, when hogs, or other animals enter a packing plant, their hides are normally covered with a substantial amount of dirt, loose hair, manure, and the like which has been picked up during transportation and storage in the stockyard pen. If the animal is not dehaired and cleaned prior to the dehiding operation, the dirt, hair and other contaminants have a tendency to fall onto the stripped carcass as the hide is being pulled upwardly. When the hide is finally freed from the carcass, the release is frequently accompanied by a shower of dirt, hair, and other debris which falls around and onto the skinned carcass. This dirt is very difficult to remove from the dehided carcass and usually requires either separate step to wash or otherwise remove the dirt from the fat remaining with the carcass, or the outer layer of the fat is trimmed away and is relegated to nonedible uses.

THE PRESENT INVENTION

The present invention contemplates suspending a hog carcass in the head-up position, freeing the hide from around the neck and head, and grasping the freed hide and pulling it downwardly, towards the butt end of the hog, whereby the substantially vertical pull removes the hide from the carcass. The present invention does not require the carcass to be secured from two points, since it has been found that adequate suspension can be achieved by hanging the carcass from the jawbone.

Further, it has been found that if the hide is removed in a downward direction, or in a direction which is principally downward, the problem of dirt falling onto the dehided carcass is eliminated or at least minimized. It has still further been found that a far superior dehiding operation can be accomplished if, with respect to the amount of fat pulled away from the carcass with the hide, the hide is removed beginning from the neck and shoulder portion of the carcass and is drawn towards the butt, as compared to removing the hide from the butt end towards the head. It has been found that all of these objectives can be met if the animal is suspended in the head-up position from hooks which are swivelly mounted to the trolley on the overhead track or conveyor. The most difficult part of the animal to skin or to prepare for hide pulling is the neck and head region, and this portion of the animal is particularly difficult to work on when the carcass is in the head-down position. It has been found that the head-up position facilitates skinning the head and neck portion, since the forelegs tend to fall away from the head when the carcass is in the head-up position. Further, the heads and necks are located at about the same height in the head-up position, as compared to the head-down position in which the height of the head depends upon the length of the animal. While it is usually necessary to invert the animal from the conventional head-down position to the head-up position in order to carry out the present invention, the mechanism by which the inversion can be accomplished is relatively easy to produce, as is explained below.

The present invention contemplates the skinning of hog carcass, whereby the hide is pulled from the carcass commencing from the head and pulling toward the butt end of the carcass, whereby the hide is removed as a single piece with the minimum amount of fat connected thereto. The present invention further contemplates that the hog carcass is suspended in the head-up position, whereby the hide is grasped and pulled downwardly toward the butt end of the hog. In addition to providing a process which can be carried out with a minimum amount of complex apparatus, the present invention removes the hide from the carcass of the hog in a manner so that dirt, hair pieces and other bits of foreign matter, which may adhere to the hide, are thrown down and away from the carcass, thereby minimizing the contamination of the carcass during the dehiding operation.

The present invention may be integrated into conventional butchering plants, wherein the animals are initially suspended by their hind feet or hind legs. In order to employ the present invention in a conventional plant, the attitude of the hogs must be inverted to the head-up position prior to the dehiding operation. Following the dehiding operation, the carcasses may be inverted again, if desired, to the head-down position. The present invention also can be used in novel butchering operations, wherein the hogs are maintained in the head-up position during the subsequent butchering operation.

The specific nature of my invention will be apparent to those skilled in the art upon a reading of the detailed specification and claims which follow, reference being had to the drawings in which several embodiments are shown by way of example, and in which:

FIG. 1 is an elevational view of my dehider operation showing a substantially horizontal hog carcass suspension system and a downwardly moving hide removing means;

FIG. 2 is an elevational view of another embodiment of the dehider operation showing the hog carcass inversion operation and the overhead carcass suspension track vertically ascending as it passes over the substantially horizontal hide removing means, and the dehiding operation;

FIG. 3 is an elevational view of a preferred embodiment showing subsequent optional operations including brisket splitting, loin eye and tenderloin freeing, cutting the back ribs free of the backbone, backbone removal, reinversion of carcass, and, after marking, pulling the head from the carcass; and FIG. 4 is an elevational view of a semi-continuous embodiment wherein the carcass idles on the overhead suspension system while a hoist and pully removes the hide by pulling the hide downwardly.

Referring generally to FIG. 1, the hog carcass suspension system is shown generally at 20. The carcass suspension system shown at 20 may be a portion (the dehider station portion) of a conventional suspension system adapted to convey the carcass to the various operations in the slaughter house. In this embodiment, the suspension system substantially horizontal, and is adapted to move the carcasses through the dehider station at a relatively uniform horizontal speed. FIG. 1 shows a series of carcasses suspended by hooks 12 which are adapted to engage the jawbone of the hog carcass and suspend the carcass in the head-up position.

The embodiment shown in FIG. 1 illustrates a substantially horizontal hog carcass conveyor 20, which may be conveniently suspended from the beam arrangement of a packing plant, and which is particularly well adapted for use in a one story building, although it may also be used in multi-story buildings.

In order to remove the hide from the carcass it is first necessary to loosen at least a portion of the hide from around the neck and shoulders of the carcass. Loosening the hide facilitates attaching the hide grasping or pulling means 32 to the hide. The extent of the loosening operation will vary from animal to animal depending upon the age, size and sex of the animal. In the case of older or larger hogs it is generally preferable to cut the hide not only completely around the neck, but away from the forelegs and feet and down the underside of the hog as well. This precutting, although it requires the use of labor, facilitates removal of the hide without tearing, thus producing a more valuable hide. Generally it is preferred to do as little loosening as possible in order to save on the labor costs, but it is necessary that the loosening be sufficient to provide a good hold for the gripping means and to loosen up any area of the hide which may tend to tear the hide rather than permit the hide to pull off and away from the carcass. Removing the hide as a single piece not only produces a hide which is more valuable, but eliminates the amount of hand hide trimming necessary after the major portion of the hide has been pulled away from the carcass.

Federal Regulations may require that a portion of the skin be removed from the jaw or head before the carcass suspension hooks are engaged in the jawbone. Under such circumstances it is contemplated that a portion of the jaw of the carcass should be freed from skin before the jawbone engaging hook 12 is inserted. However, for purposes of the present invention, it is preferred that no skinning or only a small partial skinning of the head be accomplished while the hog is in the head-down position. The balance of the head may be skinned either before or after the hog is inverted. Generally it has been found that the skinning can be more effectively accomplished when the hog is in the head-up position, since the forelegs tend to fall away from the neck and shoulder area which is the most difficult area to skin.

It is preferred that the skin be freed from the head, forelegs, part of the shoulder and the belly using the conventional techniques. The skin is preferably slit along the back of the head and the ears are cut free of the carcass and the cartilage along the back of the neck, but the hide from the skin along with the ears are left attached to the skin. The skin from the head, along with the ears, can serve as a convenient point to attach the hide grasping means 32 to the hide.

At the position indicated at Station C of FIG. 1, the hide of the carcass is loosened from the carcass about the head and neck. This is a conventional operation and may be carried out by power knives, or manual cutting or by a combination of means. The purpose of the loosening operations is to free the hide from the neck and head region, to which the hide is securely attached to the carcass and to permit the hide to be grasped for removal. The present invention contemplates freeing the hide from the neck and head in the manner described in U.S. Pat. Nos. 3,423,789 or 3,621,514.

The hide removal means is shown generally at 30. It may conveniently take the form of a chain conveyor 31 which is driven and supported by wheels 34 and 36, idlers 38, 39, and 40 a track system, not shown. Attached to the chain conveyor 31 are hide grasping means 32, which may take the form of hooks, as is shown. The hide grasping means 32 can comprise one or more hooks, grippers, shackles or clamps of any convenient design which will firmly grasp the loosened hide at one or more points for the pulling operation. For instance, the gripping means may be a simple hook, or an ice tong type device, as well as other types which will be apparent to those skilled in the art.

The hide removal means 30 is preferably mounted in approximately the same vertical plane as the carcass suspension means 20, and adapted to move the grasping means 32 at the same horizontal speed as the hooks 12. Since the hide removal means 30, shown in FIG. 1, descends from the horizontal plane, it must actually run at a somewhat greater speed than the carcass suspension means 20, in order to maintain the same horizontal speed. As is shown in FIG. 1, the hide removal means 30 starts at a point near the carcass suspension means 20, near station D, and gradually descends, substantially vertically, away from the carcass suspension means 20, to a point substantially below same carcass suspension means 20.

The hide grasping means 32 grasps the loosened hide at Station D. As the carcass suspension means 20 moves horizontally, grasping means 32, which is also moving horizontally begins to move down and away from suspension means 20 and slowly peels the hide down and off the carcass as the carcass moves through Stations E, F, G, H, and I. By the time the carcass reaches Station J the hide has been removed from the carcass, the removal having been accomplished with a single point suspension by drawing the hide downwardly and away from the carcass. The hide removal means 30 may include means to automatically release the hide from the hide grasping means 32. An apparatus such as is shown in U.S. Pat. No. 3,500,494 may be adapted for use in the present invention. This same conveyor 30 may be used to convey the hide to a curing or storage area.

FIG. 2 schematically illustrates the animal dehider of the present invention installed in a conventional meat packing plant. The carcass suspension means is shown generally at 10, and may extend throughout the butchering floor of the plant and be suspended from a beam arrangement or it may be installed so that it can rise from one story to the next higher story of the building. Typically the shackle conveyor 10, shown at position A, is separate from the dressing conveyor 10, shown at stations B et seq., but the present invention is not limited to separate conveyor means. The animals to be butchered and dressed are initially suspended by the use of conventional hooks or shackle chains 11 which move along a conventional shackle conveyor 10 by means of trolleys or wheels to which the hooks or shackle chains 11 are connected. The trolleys are moved along the carcass suspension means 10 and are maintained at a convenient distance apart.

Shown at position A is a hog suspended by the shackle or shackle chain from the carcass suspension means 10, in a head-down attitude, as is practiced in conventional packing houses. In order to adapt the present invention to a conventional packing house process, it is necessary to invert the carcass from the head-down to the head-up attitude. A suitable carcass inversion device is shown diagrammatically in FIG. 2, wherein a jawbone engaging hook 12, is attached to an inversion apparatus 14. The hook 12 is adapted to engage the animal's jawbone while the carcass is suspended in the head-down attitude from shackle means 11 as is shown at Station A. As was mentioned above, it maybe desired to skin the jaw area of the carcass prior to inserting the jawbone hook 12. The inversion apparatus 14 elevates hook 12, whereby hook 12 gradually takes the weight of the carcass. The foot or leg is released from the carcass suspension means 10 after the weight of the carcass is gradually taken up by jawbone hook 12. The hook or shackle chain 11 may be released from the carcass at this point. As is shown at Station B, the jawbone hook 12 is elevated to the height of dressing conveyor, or carcass suspension system 10, and is attached thereto. The mechanism by which hook 12 is connected to the carcass and is inverted on the carcass suspension system 10 is not critical. Those skilled in the art will be aware that various mechanical means such as is described in U.S. Pat. No. 3,657,770 may be employed. As is shown in position B of FIG. 2, the butt end of the hog is gradually released.

At Station C, the hide is loosened around the neck and shoulder area of the carcass by cutting, whereby a grasping means 32 can be attached to the loosened end of the hide. This portion of the operation is essentially the same as the Station C of the embodiment of FIG. 1. As was mentioned above, the extent of the loosening at Station C depends to some extent on the size, age and sex of the hogs.

At Station D, the actual dehiding operation commences. While it is possible to perform the dehiding as a semi-continuous operation, using a hoist mechanism of the type shown in FIG. 4, it is preferred to use a continuous horizontal conveyor 30, mounted on the floor of the type as is shown in FIGS. 1 and 2. The track on conveyor 30 has mounted thereon a series of grasping means such as shackles or hooks 32 which move at the same horizontal speed as carcass suspension means 10. Hooks 32 are used to grasp the hide of the hog and are engaged on the hide at Station D. Commencing at Station D, of FIG. 2, the carcass suspension means 10 begins to move vertically upward, while maintaining a horizontal motion. The hooks 32 and the carcass suspension means 10 travel at the same horizontal speed, but the hooks 32 gradually move away from suspension means 10 as is shown at Stations D, E, F, G, H, I, and J. The vertical movement of hooks 32 with respect to hooks 12 causes a pulling of the hide with respect to the carcass and the hog hide is stripped from the carcass. In the embodiment shown in FIG. 2, the horizontal conveyor 30 moves at a somewhat slower speed than the carcass suspension means 10, in order to maintain the same horizontal speed.

Preferably the chain conveyor 30 is mounted more or less vertically beneath the carcass suspension means 10, whereby the hide is pulled substantially vertically downward. While it is possible that under some circumstances it may be desired to put some lateral motion in the hide stripping motion in which case the hide removing means (chain conveyor 30) should be vertically offset from the carcass suspension means 10, but they both should move at approximately the same speed. Since the present invention contemplates the hog being suspended by its jaw as a single point of attachment during the dehiding operation, it is preferred that the hide pulling chain conveyor 30 be substantially vertically beneath the carcass suspension means 10, whereby the hide is pulled downwardly.

FIG. 1 shows an embodiment of the present invention which is more adaptable for use in one story packing plants. In the embodiment shown in FIG. 1, the overhead conveyor 20 is substantially horizontal, and may be conveniently suspended from the ceiling of the packing plant, while chain conveyor 30, which is used to strip the hide from the carcass, may be installed in a pit or below the plant floor. The embodiment shown in FIG. 2 is more adaptable to a multi-story building, but neither embodiment is limited to any particular building configuration. It will be obvious to those skilled in the art that a combination of the embodiments shown in FIG. 1 and FIG. 2 may be used, wherein neither carcass suspension means 10 or 20 nor chain conveyor 30 are horizontal. The essence of the present invention simply requires that the two conveyors move apart in a substantially vertical direction while a synchronized horizontal movement is maintained, whereby a downward pull is generated for removing the hide from the carcass.

Any of the embodiments, namely those shown in FIG. 1, FIG. 2 or FIG. 4, may be used in a conventional butchering process, whereby the hog carcass is reinverted as is shown in Station M of FIG. 3. From this point on, the conventional butchering operations may be used. However, it has been found desirable, in some operations, to carry out one or more of the steps shown in FIG. 3 as a part of the butchering and packing operation.

Referring to FIG. 3, Station K shows diagrammatically the splitting of the brisket or breast bone while the carcass is suspended in the head-up attitude. It has been found that the head-up attitude facilitates splitting the brisket because the intestines hang down and away from the area of the brisket. Therefore accidental cutting of the intestines (and contamination of the carcass) is avoided. Preferably the brisket is split, as shown at Station K, by insertion of a long knife at position 62, wherein the point of the knife imbeds in the backbone, and then using the knife point as a fulcrum, pulling the knife down to position 64. However, the brisket may be split by more conventional means such as a cleaver knife and mallet or a power saw.

Next FIG. 3 shows, diagrammatically, at Station L, the freeing of the loin muscle from the backbone, while the carcass is in the head-up position. The loin freeing is preferably accomplished in conjunction with the cutting of the chine bone as is shown at Station M. The cutting of the chine bone may be accomplished by passing a saw downwardly along side of the backbone, whereby the ribs are severed from the backbone. The head-up position facilitates the cutting of the chine and the freeing of the loins because the spinous process portion of the chine bone (the portion analogous to the dorsal fin of a fish) is angled downwardly and outwardly, whereby a cut made downwardly from head to butt has less chance of sticking in the bone. Such a cut can be made with a single stroke, thus saving time and labor. This cutting facilitates removal of the desired meat portions as well as removal of the back bones while the carcass is still on the conveyor 10. It may be advantageous to hook one loin eye of one hog to the loin eye of the next adjacent hog in order to spread the loin away from the backbone.

Station N illustrates the reinversion of the carcass to the conventional head-down position.

Station O depicts the head removal which may follow the splitting of the brisket and deloining in Stations K, L, and M. The head removal can be accomplished by engaging the jaw of the carcass and pulling downwardly, while the carcass is suspended by the hind legs. The pulling operation first fractures or separates the atlas (or neck) joint, and then the head is pulled off, leaving much of the head meat affixed to the carcass (where it is more valuable). Prior to pulling, it may be desirable to mark the head behind the ears and below the jowl in order to assure that the jowls will be left on the carcass, rather than the head. Marking the head may be particularly advantageous when the head has not been completely skinned prior to the head removal. The head removal operation can be accomplished quickly by a hydraulic puller as is shown at 50. Alternatively, a lever or eccentric wheel may be used to provide the required pulling force. The subsequent deheading operation can be accomplished with greater ease after the atlas bone has been fractured.

It is also possible to separate the atlas joint while the carcass is in the head-up position. It is sometimes advantageous to separate the atlas joint in the head-up position during the downward pull which is used to remove the hide from the carcass. It has been found possible to separate the atlas joint at this point without destroying the flesh structure by which the head is affixed to the balance of the carcass and by which the carcass is suspended from conveyor 10.

The present invention further contemplates backbone removal as a complementary step to the hide removal described above.

Although it is presently preferred to suspend the carcass in the head-up position by a hook engaged in the jawbone, the present invention is not so restricted and contemplates other means of suspension such as a noose or by the forelegs using shackles or the like.

It is not required that the process steps shown in FIG. 3 follow the order there shown or that all of the process steps be used. For instance, the brisket cutting operations (Station K) could follow Station M or could be omitted. While the invention has been described herein as applied to hogs, it will be apparent to those skilled in the art that the present invention may also be applied to other animals such as cattle, calves or sheep. The forms of invention herein shown and described are considered to be only as illustrative. It will be apparent to those skilled in the art that numerous modifications may be made therein without departure from the spirit of the invention or the scope of the appended claims.

I claim:

1. A method of skinning a hog comprising the steps of:
   A. Suspending a hog carcass in a head-up position,
   B. Freeing the hide from around the neck and head of the carcass, and
   C. Grasping the freed hide at its upper end, and pulling downwardly on the hide to remove the hide from said carcass.

2. The method as described in claim 1, wherein the carcass is suspended in the head-up position by engaging a hook in the jawbone of said carcass.

3. A method as described in claim 1, wherein the carcass is moved horizontally at a substantially uniform speed throughout said skinning operation.

4. A method as described in claim 1, wherein said carcass is moved at a substantially uniform speed, but is moved both horizontally and vertically upward with respect to said hide grasping means throughout said skinning operations.

5. A method of slaughtering hogs which comprises: suspending a hog carcass in a head-down attitude, bleeding the carcass,
inverting said carcass whereby said carcass is suspended in the head-up position,
freeing the hide from the neck and head of the carcass, and
grasping the freed hide at the upper end and pulling the hide downwardly to remove the hide from the carcass.

6. A method as described in claim 5, wherein the carcass is suspended in the head-up position by engaging a hook in the jawbone of said carcass.

7. A method as described in claim 5, wherein the carcass is moved horizontally at a substantially uniform speed throughout said skinning operation.

8. A method as described in claim 5, wherein said carcass is moved at a substantially uniform speed, but is moved both horizontally and vertically upward with respect to the means for grasping the upper end of the hide throughout said skinning operation.

9. A method of slaughtering hogs, as described in claim 5, which includes the step of pulling the head to separate the atlas joint.

10. A method of slaughtering hogs, as described in claim 9, wherein the atlas joint is separated by the pull which pulls the hide downwardly to remove the hide from the carcass.

11. A method of slaughtering hogs, as described in claim 5, which includes the step of splitting the brisket while said carcass is in the head-up attitude.

12. A method of slaughtering hogs, as described in claim 5, which includes the step of loin freeing while said carcass is in the head-up attitude.

13. A method of slaughtering hogs, as described in claim 12, which includes the step of cutting the ribs from the backbone while said carcass is in the head-up attitude.

14. A method of slaughtering hogs, as described in claim 13, which includes the step of backbone removal.

15. A method of slaughtering hogs, as described in claim 5, which includes the steps of brisket splitting loin freeing, and cutting the ribs from the backbone while said carcass is in the head-up attitude.

16. A method of slaughtering hogs, as described in claim 15, which includes the step of backbone removal.

17. In a method of slaughtering hogs which includes killing a hog, suspending the carcass from a horizontally moving conveyor in the head-down position, bleeding the carcass, and skinning the carcass, the improvement which comprises inverting said carcass to the head-up position prior to the skinning operation, freeing the hide from around the head and neck of the carcass, and pulling the hide downwardly to remove the hide from said carcass.

18. A hog dehider comprising:
   A hog carcass suspension system adapted to suspend hog carcasses in the head-up position and move said carcasses through a dehider at an uniform speed;
   a power driven hide removing means mounted adjacent to and below said hog carcass suspension system and adapted to move at the same horizontal speed as the hog carcass suspension system;
   a hide grasping means carried by said power driven hide removing means, said grasping means adapted to grasp the hide of said carcasses near the upper portion thereof and connect said hide to said hide removing means;
   said hide removing means adapted to cooperate with said hide grasping means and exert a downward pull on said hide to remove the hide from the carcass by drawing the hide downwardly.

19. A hog dehider as described in claim 18, wherein said hog carcass suspension system moves vertically with respect to said hide removing means, whereby a downward pull is exerted on the hides by said hide removing means.

20. A hog dehider as described in claim 19, wherein said hog carcass suspension system moves substantially horizontally, while said hide removing means moves downwardly relative to said hog carcass suspension system in the area of said dehider.

21. A hog dehider, as described in claim 19, wherein said hog carcass suspension system rises upwardly, while said hide removing means moves substantially horizontally, in the area of the dehider.

22. A hog dehider as set forth in claim 18, wherein said hide removing means consists of a track mounted beneath said hog carcass suspension system, said track having power driven wheeled hooks disposed thereon, said hooks adapted to grasp the hide of said carcasses.

23. A hog dehider as set forth in claim 18, wherein said hide removing means consists of a constantly moving power driven conveyor, mounted substantially below said carcass suspension system and synchronized therewith, said conveyor having hooks disposed therein for grasping the hides of said carcasses.

24. A hog dehider as set forth in claim 23, wherein the hide removing means is horizontally offset a short distance from the vertical plane of the carcass suspension system.

25. A hog dehider as set forth in claim 18, wherein said hide removing means consists of a power driven conveyor beginning at a high point near said hog carcass suspension system and descending to a point substantially below said hog carcass suspension system.

26. An apparatus for dehiding a hog carcasses by pulling the hide down and away from said carcasses comprising,
   a continuously moving overhead hog carcass suspension system, from which the carcasses are suspended in the head-up position, said suspension system extending through the dehiding area so as to move the carcasses through the dehider area at a relatively constant speed,
   a continuously moving hide removing means mounted in substantially the same vertical plane as said suspension system, moving at the same horizontal speed, but moving downwardly therefrom to a point substantially below said carcass suspension system,
   means for securing the hides of said carcasses to said hide removing means,
   said hide removing means being adapted to exert a downward pull on the hide through said securing means, so as to completely remove the hide from the carcass as the carcass moves continuously through said dehiding area.

27. A hog dehider as set forth in claim 26, wherein the hide removing means is horizontally offset a short distance from the vertical plane of the carcass suspension system.

* * * * *